April 8, 1941. F. M. LITTELL Re. 21,766

AUTOMATIC CONTROLLING APPARATUS FOR STRIP FEEDING MECHANISM

Original Filed Dec. 13, 1937 4 Sheets-Sheet 1

Inventor:
Frederick M. Littell:
By: Wilkinson Huxley Byron & Knight Attys.

April 8, 1941. F. M. LITTELL Re. 21,766

AUTOMATIC CONTROLLING APPARATUS FOR STRIP FEEDING MECHANISM

Original Filed Dec. 13, 1937 4 Sheets-Sheet 2

Inventor:
Frederick M. Littell:
By: Wilkinson Huxley Byron & Knight
Attys:

April 8, 1941. F. M. LITTELL Re. 21,766

AUTOMATIC CONTROLLING APPARATUS FOR STRIP FEEDING MECHANISM

Original Filed Dec. 13, 1937 4 Sheets-Sheet 3

Inventor:
Frederick M. Littell:
By Wilkinson Huxley Cynner & Knight
Attys.

April 8, 1941. F. M. LITTELL Re. 21,766
AUTOMATIC CONTROLLING APPARATUS FOR STRIP FEEDING MECHANISM
Original Filed Dec. 13, 1937 4 Sheets-Sheet 4
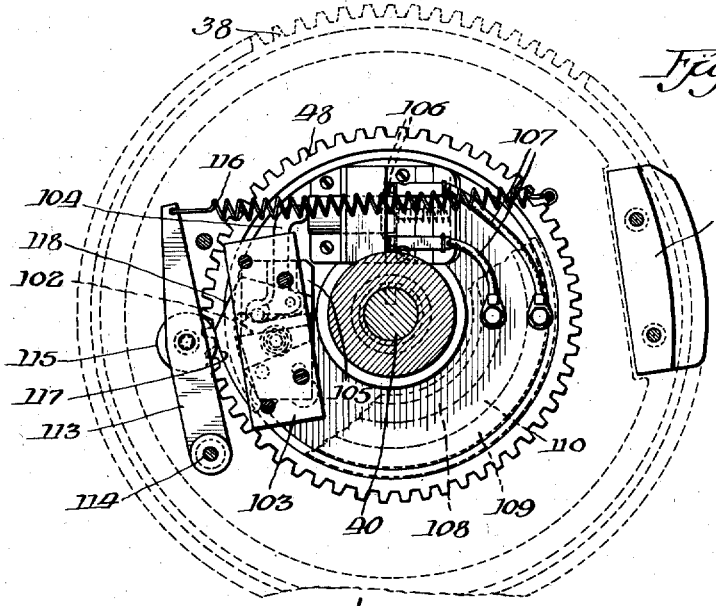
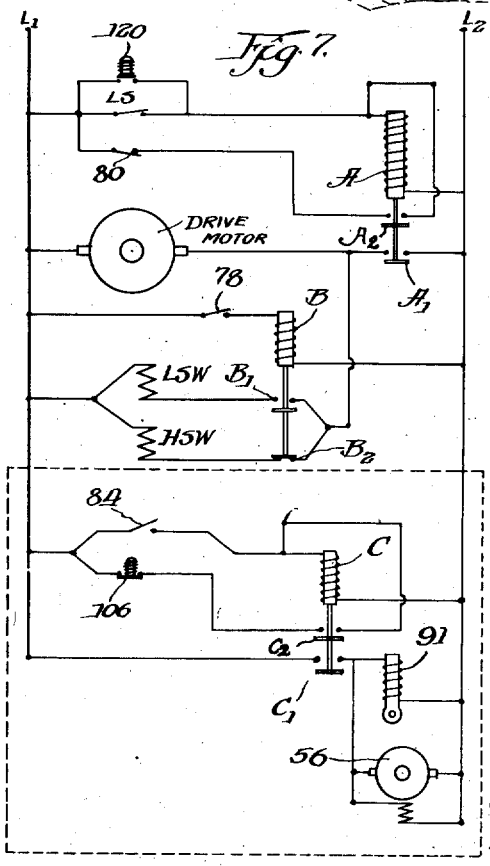
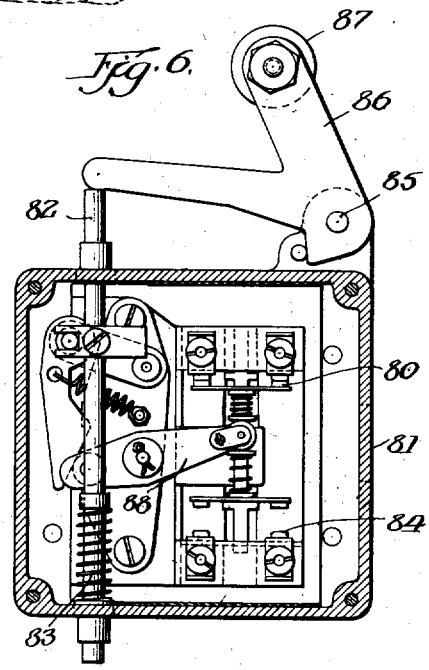
Inventor:
Frederick M. Littell,
By Wilkinson Huxley Cross & Knight
Attys.

Reissued Apr. 8, 1941

Re. 21,766

UNITED STATES PATENT OFFICE 21,766

AUTOMATIC CONTROLLING APPARATUS FOR STRIP FEEDING MECHANISM

Frederick M. Littell, Detroit, Mich., assignor to F. J. Littell Machine Company, Chicago, Ill., a corporation of Illinois Original No. 2,140,755, dated December 20, 1938, Serial No. 179,459, December 13, 1937. Application for reissue January 21, 1941, Serial No. 375,337

22 Claims. (Cl. 33—132)

The invention relates generally to the feeding of strip material to punch presses and the like and has particular reference to apparatus for controlling the feeding length of the strip material which may be adjusted to any feed length desired within the limits of the apparatus.

In the operation of stamping metal blanks from coil stock, the material has heretofore been fed to the press by feeding rollers comprising part of the press and which were intermittently driven thereby so that the feed of the stock was synchronized with the press operations. It is an object of the present invention to provide feeding mechanism which will be unitary and portable so that the same can be moved and associated with the particular press desired, which will incorporate novel means for feeding stock in desired lengths, and which may be synchronized with the stamping or blanking operations of the press.

A more specific object of the invention is to provide an automatic measuring device for controlling the feeding length of strip material and which will accurately measure successive lengths of said material within a thousandth of an inch, which will be positive in operation and easily adjusted to vary the feeding length within the limits of the particular device.

Another object is to provide measuring apparatus of the automatic returning type which will operate in cycles, each cycle corresponding to a measured length of strip material. In the operation of feeding mechanism controlled by the measuring device of the invention the drive to the mechanism is interrupted at intervals, with the result that the mechanism delivers to the press successive lengths of material that have been accurately measured and which are therefore uniform. The high degree of accuracy attained by the present measuring device is due primarily to the return feature of the device which returns the pointer and other measuring instrumentalities to zero after a measuring cycle and therefore any error in the feed as a result of overrun or other causes is not cumulative.

A further object resides in the provision of novel means for controlling the feeding length of strip material which will operate to feed the material at normal speed for the greater part of its length and at a reduced speed for the remainder of its length. By slowing down the feeding means before interrupting the drive thereto to terminate a feeding cycle the shock and strain on the feeding mechanism and gearing is considerably reduced and over-run is lessened so that greater accuracy is secured.

A further object of the invention is to provide a measuring device having means for returning the pointer and other measuring instrumentalities to zero, which will be positive in operation, and which will be electrically actuated so that control of the same can be effected through switch means.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 5 is a detail sectional view taken along lines 5—5 of Figure 3 showing the location and manner of actuation of the automatic resetting switch;

Figure 6 is an elevational view of the stop switch with the cover removed to show the internal construction; and Figure 7 is a diagrammatic wiring diagram showing the electrical circuit for the measuring device.

Figure 1:
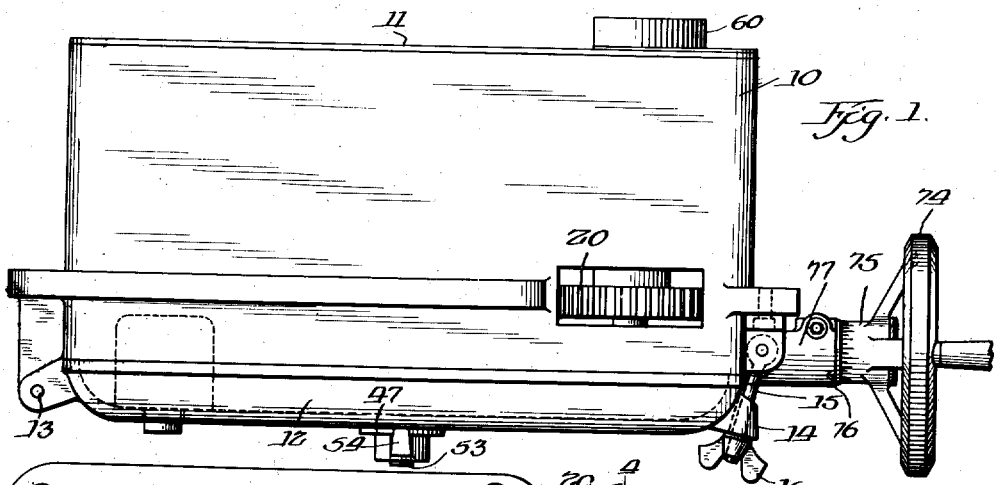
Figure 1 is a top plan view of the casing or housing for the measuring device of the invention.
Figure 3:
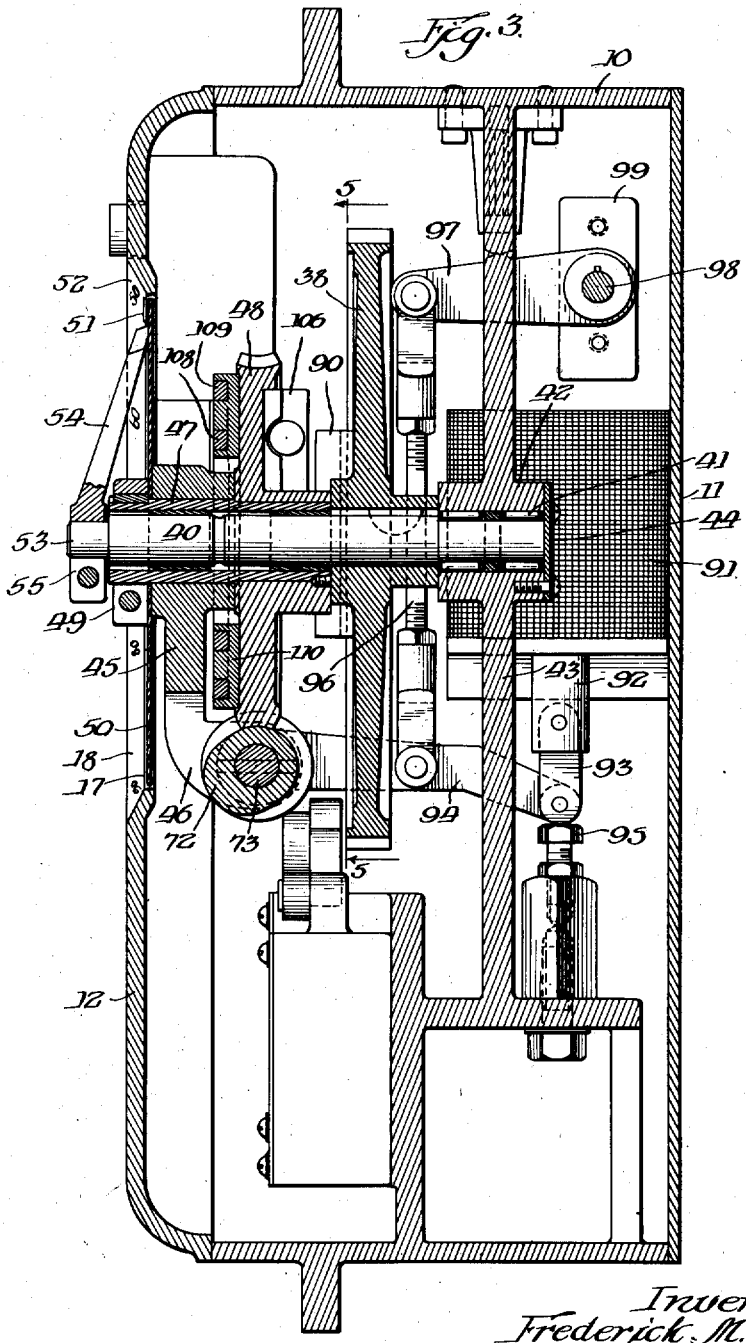
Figure 3 is a vertical sectional view taken substantially along line 3—3 of Figure 2 showing the internal mechanism of the present device with the cover of the housing in place.

Referring to the drawings which show the embodiment of the invention selected for illustration, numeral 10 refers to the housing or casing of the device and which is provided with a rear plate 11 suitably secured to housing 10 by any suitable means such as bolts, not shown. A cover plate 12 is hinged to the housing as at 13 and said cover is provided with a handle or projection 14 by which the same may be locked to the housing by bolt 15 and lock nut 16, as clearly shown in Figure 1. Centrally the cover plate is provided with an opening 17, Figures 3 and 4, around which the cover plate is provided with a bevelled surface 18 for marks or graduations representing the measured length of the strip material.

The device is mechanically connected with the feeding rolls of conventional feeding mechanism or with a measuring roll driven by the travel of the material to be measured. The mechanical connection whereby the device is driven proportionally to the rotation of the feeding rolls and thus in proportion to the feed of the strip material is effected by a flexible drive shaft or the like which has operative connection with the gear 20. Said gear is fixed to shaft 21 so as to turn therewith, there being formed integral with said gear and likewise fixed to the shaft the pinion 22 which can also be described as having rotation conforming to that of the shaft. The block 23 fixed to the rear plate 11 carries bearing 24 journalling one end of shaft 21 and a similar bearing 24 is supported by member 25 and journals the other end of said shaft.

Below shaft 21 the block and member 23 and 25, respectively, rotatably support shaft 26, the respective ends of the same being mounted by bearings 27. Said shaft carries the gear 28 having meshing engagement with pinion 22 and which is accordingly driven thereby. Said shaft is formed with a shoulder 30 which properly positions the gear 28 on said shaft and which is mounted so as to have independent rotation. The gear 28 is formed with a concentric recess within which is mounted the roller drive hub 31 and the extending portions 32 of the collar release shell 33, said extending portions having interlocking relation with the roller drive hub. The hub 31 is keyed to shaft 26 and the release shell 33 is held to the shaft by a pair of spring pressed pawls 34. Said shell pivotally carries a plurality of clutch fingers 35 which are actuated by the clutch collar 36.

Figure 2:
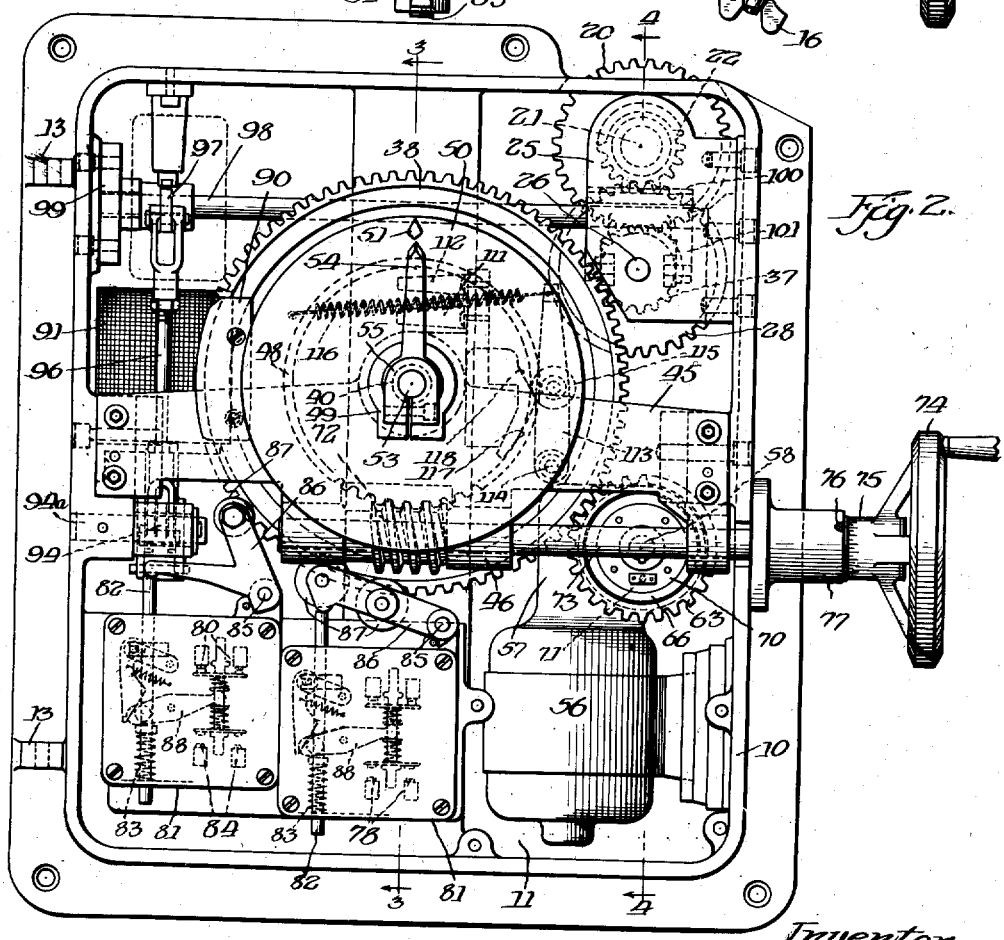
Figure 2 is a front elevational view of the present measuring device, the cover for the housing having been removed.
Figure 4:
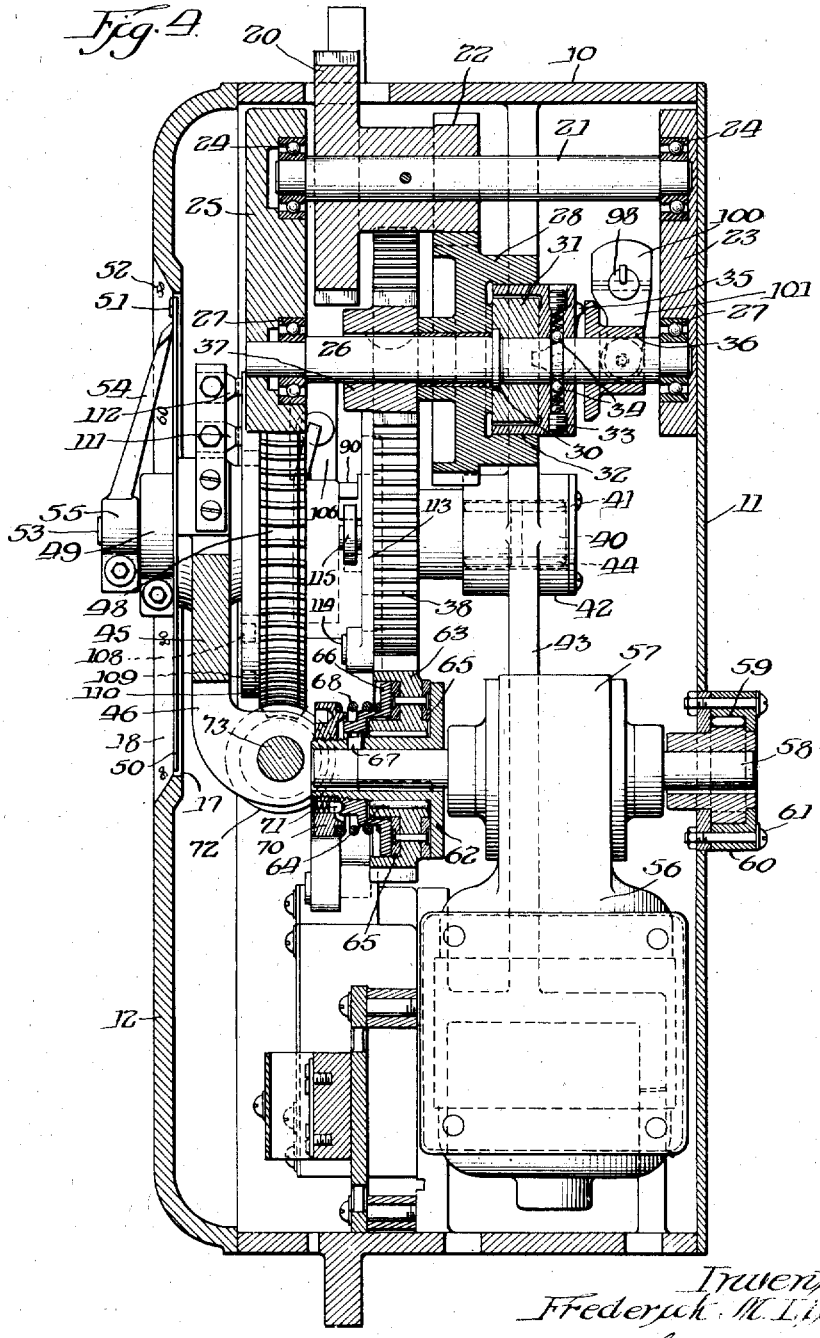
Figure 4 is a vertical sectional view taken substantially along line 4—4 of Figure 2.

When the parts of the clutch above described are positioned as shown in Figure 4 the clutch members, not shown, but which are carried by the driving hub 31 are in contact with the interior wall of gear 28 and the rotations of the gear are thereby transmitted to shaft 26 which has suitably keyed thereto the pinion 37, the same being located to the left of gear 28. As better shown in Figure 2, said pinion has meshing engagement with the main gear 38 keyed to the shaft 40. Said shaft 40 is journalled at its right hand end, Figure 3, by the roller bearings 41 which are supported by the hub portion 42 of the vertically extending bracket 43. Plate 44 seals the space occupied by the roller bearings 41 and may be removed when it is necessary to lubricate said bearings. The left hand end of shaft 40 is suitably supported by the bracket 45, which extends transversely of the housing from one side wall thereof to the other, Figure 2, and has integral depending portions 46. Between bearing 41 and said shaft 40 there is interposed the bushing 47 which has a portion extending beyond the cover 12, whereas, the other end of said bushing carries a worm gear 48 suitably keyed thereto.

It will be understood that said bushing is mounted on the shaft 40 for rotation independently of the same and is suitably held properly located on the shaft by means of the split collar 49 secured to the end of the bushing projecting beyond the cover 12. Also fixed to said bushing so as to rotate therewith is a disc 50 which fits within and substantially closes the opening within the cover 12 of the measuring device. The only indicating mark appearing on this disc is the diamond or other distinctive symbol 51 which when positioned opposite a numeral of the indicia 52 on the cover plate will indicate that the measuring device is set for controlling the feed of strip material in lengths corresponding to the magnitude of said numeral. Shaft 40 is formed with a reduced vertically extending portion 53 to which is secured the pointer 54, said pointer being fixed to said reduced portion although adjustable as a result of the split collar 55. During operation of the device said pointer has rotation in a clockwise direction, Figure 2, starting from diamond 51 and continuing until the zero of the indicia 52 is reached, whereupon the shaft, and thus the pointer 54, will be immediately caused to rotate in a counter-clockwise direction until the pointer reaches the diamond 51, thereby terminating one measuring operation by clearing the electrical circuit and putting the same in condition for the operator to start another measuring cycle.

The clockwise rotation of shaft 40 and the pointer 54 is accomplished by the drive from the measuring roll of the press which has operative connection with gear 20. The drive continues through the shaft 21, the clutch including the roller drive hub 31, shaft 26 and the gearing connecting shaft 40 therewith. The counter-clockwise rotation of shaft 40 which returns the pointer 54 to its initial position, whereby the electrical circuit is cleared, is accomplished by the electric motor designated in its entirety by numeral 56, the said motor having a head portion 57 whereby the rotor shaft of said motor through suitable gearing drives the horizontally disposed shaft 58. Suitably fixed to the right hand end of said shaft 58 is an overrunning clutch 59, the housing 60 of which is fixedly secured by the screws 61 to the rear cover 11. Said overrunning clutch is provided in order to prevent reverse rotation of the shaft 58. The left hand end of said shaft carries a hub 62 which is keyed to said shaft, the hub in turn having rotatably mounted thereon the friction gear 63, there being interposed between said gear and the hub a bearing 64. The web of gear 63 is provided with a plurality of friction washers 65, said washers being disposed on both sides of the web of said gear and which therefore have frictional engagement with the flange of the hub 62. The pressure plate 66 has contact with the friction washers 65 on the other side of the web of said gear 63 and which plate is likewise keyed to the shaft by means of the pin 67. The coil spring 68 yieldingly forces said pressure plate into contact with said friction washers, the said spring being confined between the plate and the collar 70 threaded to the end of the hub 62 and held in adjusted relation with the pressure plate by the spring detent 71. When the electric motor 56 is energized the rotations of shaft 58 will be frictionally transmitted to the gear 63 to thereby drive the main gear 38 in a direction for returning the pointer 54 as above described.

As a result of rotation of the disc 50 the diamond 51 can be located in alignment with other indicia on the cover plate which will vary the measured lengths of the strip material so that the same will correspond to the magnitude of the device in alignment with the diamond. The said rotation of the disc is accomplished by rotating gear 48, the said gear and disc being connected together through the bushing 47. Gear 48 meshes with the worm 72, Figure 2, fixed to the shaft 73, suitably journalled within the casing by the portions 46 of the transverse bracket 45 and which shaft extends beyond the housing at the right hand end thereof, Figure 2, for receiving the hand wheel 74. Said hand wheel has indicia 75 thereon and which is associated with the indicator 76 on the stationary collar portion 77. By rotating the hand wheel rotation will be imparted to the gear 72 and thus to the gear 48. Accordingly, the disc will be rotated in proportion to the rotation of the hand wheel. It is possible to select a gear ratio so that a complete revolution of the hand wheel 74 will rotate the disc 50 just the proper amount to vary the location of the diamond 51 with respect to the indicia 52 one unit. Thus ten turns of the hand wheel, for example, would change the location of the diamond 51 from 50 to 60, which would have the effect of changing the length of the measured strips of material a like amount. By means of the indicia 75 on the hand wheel and the indicator 76 a high degree of accuracy in the adjustment of the disc 50 can be obtained.

Located in the lower part of the housing 10 is a slow-down switch 78 of the normally open type and a stop switch 80 of the normally closed type, the said switches being located within their respective switch boxes 81. Each switch, as more particularly shown in Figure 6, consists of an actuating rod 82 yieldingly biased by means of the coil spring 83 in an upward direction to maintain the upper contacts 80 in engagement. Pivotally supported at 85 from the switch boxes 81 is an actuating lever 86. One arm of said lever carries the roller 87 and the other arm having engagement with the top of rod 82. When said lever is actuated to depress the rod 82 the arm 88 of the switch is likewise actuated, causing the contacts 80 to separate and the lower contacts 84 to engage. The switches are therefore of the double-acting type wherein one pair of contacts are separated by a snap action resulting in engagement of the other pair of contacts. An efficient switch similar in construction and actuation to the one above described is manufactured by the Square-D Company and is known as Type L-D.3. The slow-down and stop switches have electrical connection with the motor driving the mechanism which feeds the strip material to the press and thus actuation of the slow down switch will reduce the speed of the feeding mechanism. For the slow-down switch only the normally open contacts, namely, 78 are employed. Said switch contacts when actuated to a closed position reduce the speed of the feeding mechanism although the mechanism continues to operate until stopped by actuation of the stop switch 80. In accordance with the invention, the above described switches are actuated by the gear 38 and more specifically by the projection or lug 90 carried by said gear, Figure 5. The slow-down switch is actuated first by the lug 90 which contacts the rollers 87, resulting in closing the contacts 78. As will be better understood by reference to the wiring diagram, Figure 7, the closing of said contacts cuts in the slow speed winding of the drive motor. As gear 38 continues to rotate in a clockwise direction the lug 90 will engage roller 87 of the lever 86 of said stop switch. When this switch is actuated the contacts 80 are broken, which opens the circuit to the motor driving the feeding mechanism and thus feeding of the strip material stops.

When the feeding mechanism is stopped the drive to the measuring device also ceases and as this drive is responsible for the clockwise rotation of gear 38, said gear likewise comes to rest. As will be clear by reference to Figure 6 separation of contacts 80 of the stop switch results in closing contacts 84. As shown in the wiring diagram, Figure 7, closing of contacts 84 will energize the solenoid 91 and will also close the circuit to the electric motor 56. By actuation of linkage which will now be described the energization of the solenoid 91 will actuate the clutch shaft 26, disconnecting the drive from the gear 20 to the main gear 38 and thereby permitting said gear and the connecting parts to rotate in a reverse direction, which direction of rotation is imparted thereto by the electric motor 56 through the friction gear 63. The solenoid 91 is provided with a plunger 92 having connecting therewith at its lower end the link 93 pivotally joined to the end of the lever 94. When the solenoid is deenergized the plunger will assume its lowermost position and the said link 93 and end of lever 94 will rest upon the adjustable supporting bolt 95, the height of which may be varied in order to secure the proper degree of movement of the plunger 92. Lever 94 is rotatably supported from the stud shaft 94*a* and pivotally connects at an intermediate point with the vertically disposed link 96 which connects at its opposite end with arm 97, said arm being non-rotatably fixed to the transverse shaft 98. Said shaft is accordingly oscillated first in one direction when the solenoid 91 is energized and in an opposite direction when the plunger is caused to drop by deenergization of the solenoid. Shaft 98, which is suitably journalled in bearings 99 fixed to the respective side walls of the housing 10, has keyed to the end opposite arm 97 the bifurcated member 100, Figure 4, the depending arms 101 thereof operatively connecting with the clutch collar 36 supported for axial movement on the shaft 26. As a result of the oscillating movement of the shaft 98 said clutch collar is moved axially on shaft 26, causing actuation of the clutch fingers and corresponding actuation of the clutch.

Immediately upon termination of the feeding operation by separation of the contacts 80 of the stop switch, it will be clearly understood from the foregoing that the clutch is actuated to disconnect the drive to the main gear 38 and that operation of motor 56 is started to reverse said main gear 38 for locating the same in its initial position. This reverse rotation continues until the shoulder 102 of the lug 103, carried by the main gear 38, Figure 5, contacts the pivoted switch lever 104, carried by block 105 and which in turn actuates a resetting switch, the contacts of which are indicated by numeral 106. Said block 105 is secured to the worm gear 48 and is therefore adjustable so that the initial position from which the main gear 38 starts a measuring cycle can be varied. The resetting switch 106 is also carried by the worm gear 48 and is electrically connected by the leads 107 to inner and outer commutator rings 108 and 109, respectively, Figures 3 and 5, which rings are carried and suitably insulated by the member 110, fixed to the web of the worm gear 48 on the side opposite the resetting switch 106. Within the housing 10 and suitably supported by bracket 45 are a pair of brushes 111 and 112 which contact the commutator rings, thereby completing the circuit to the resetting switch 106 while allowing rotation of the worm gear 48 to locate said switch in adjusted position to vary the length of the strip material measured during a cycle.

As previously explained, the said main gear 38 continues to rotate in its reverse direction until the resetting switch 106 is actuated. Said switch through the connections above described breaks the circuit to the electric motor 56, thus stopping the reverse rotation of the gear and also breaks the circuit to the solenoid, thereby deenergizing the solenoid 91. The plunger of said solenoid will descend to its lowermost position upon deenergization, thus actuating the clutch to again establish the drive from gear 20 to the main gear 38. In order to prevent rebound of gear 38 with respect to the worm gear 48 when the lug and block on the respective gears engage to cause actuation of the resetting switch, the invention provides a rebound check in the form of a lever 113 pivotally secured at 114 to the main gear 38. Said lever carries the roller 115 and is yieldingly biased in a direction inwardly by the coil spring 116. The block 105 which is secured to the worm gear 48 is provided with a cam portion 117, Figure 5, which cam portion is arcuate for a part of its extent and which terminates in an abrupt shoulder 118. When the blocks contact, bringing shoulder 102 into engagement with the pivoted lever 104, to produce actuation of the resetting switch, the roller 115 will leave the arcuate portion of the cam and engage the abrupt shoulder portion 118. Due to the tension exerted by the coil spring 116 any rebound of the members which might otherwise take place is effectively prevented.

The electrical connections for the motors, switches and solenoids are shown in Figure 7. L1 and L2 indicate the wires of the power circuit. When it is desired to start the device to perform a measuring cycle the starting button 120 of the limit switch LS is closed to energize the relay A. Energization of said relay will close contacts A1 and A2. Closing of the first mentioned contact will complete the circuit to the driving motor of the feeding mechanism, thereby starting a measuring cycle. The switch button 120 can be immediately released by the operator since closing of contacts A2 will complete the circuit to the relay through the normally closed contacts 80 of the stop switch. The motor runs in high speed since the high speed winding HSW is in circuit. When the slow down switch is actuated the normally open contacts 78 will be closed, energizing relay B to cause B1 to close and contact B2 to open. As a result the high speed winding is cut out and the low speed winding LSW is connected in circuit so that the motor runs at a low speed. Continued rotation of the main gear 38 will bring the lug 90 into contact with the stop switch, actuation of which will open the contacts 80, deenergizing relay A, opening contact A1, whereby the driving motor will stop.

Simultaneously with the stopping of the driving motor by opening of the contacts 80 the contacts 84 will be closed. The relay C will therefore be energized, closing the contact C1 and contact C2. The latter will complete the circuit through the normally closed resetting switch 106 and therefore the contacts 84 can presently open, and which contacts will open due to the return rotation of the main gear 38. Closing of contact C1 will simultaneously energize the solenoid 91 and start operation of the electric motor 56. The main gear will therefore be returned to its initial starting position which will result in actuation of the resetting switch 106, opening said normally closed switch, breaking the circuit to the relay C, and opening contact C1. The solenoid will therefore be deenergized and the return motor 56 will stop. The parts are now in a position to start another measuring cycle which can be initiated by the operator by pressing the button 120 or actuation of the limit switch LS can be affected automatically from the press.

The above operations comprise a measuring cycle by which material of predetermined length is caused to be fed to the press or other machine associated with the feeding rolls. If it is desired to change the length of feed of the material it is only necessary to rotate the hand wheel 74 which will in turn rotate the gear 48, thereby changing the position of the resetting switch 106. Accordingly, succeeding measuring cycles will be either lengthened or shortened, depending on the particular adjustment of the worm gear 48. In view of the foregoing, it will be appreciated that the measuring device of the invention will operate either manually or automatically to cause successive measuring cycles. As a result of the automatic returning feature which in effect resets the mechanism, rendering the same ready for another operation, the present device is extremely accurate. Any error which may occur in one measuring cycle is not cumulative. Also any error which might result by reason of rebound of lug 103 from block 105 is effectively prevented by the rebound check carried by the main gear 38. Of course, any rebound that might take place would represent an error in the measured length of the next strip but notwithstanding the rebound check, it is very unlikely that such an occurrence would take place since the return motor 56 is of the type having uniform speed of rotation and accordingly, it will be seen that all factors that might tend to produce an error in the operation of the measuring device have been eliminated.

This application is a continuation-in-part of my earlier application, Serial No. 56,698, filed December 30, 1935 for Automatic controlling apparatus for strip feeding mechanism now abandoned.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A measuring device for controlling the operation of mechanism for feeding strip material, including a rotatable member adapted to be driven in one direction proportional to the feeding of said material, spaced and independent means positioned for successive actuation by said member during rotation thereof including means operative to reduce the speed of said mechanism whereby the feeding of said material takes place at a slower speed, and means for stopping said mechanism.

2. A measuring device for controlling the operation of mechanism for feeding strip material, including a rotatable member adapted to be driven in one direction proportional to the feeding of said material, means positioned for actuation by said member after a predetermined extent of rotation has taken place for stopping operation of the feeding mechanism, and other means rendered operative by the actuation of said stopping means for disconnecting the drive to said rotatable member and for returning said member to its starting position, whereby the parts are positioned to initiate another measuring cycle, said other means including a solenoid actuated clutch for disconnecting said drive, and an electric motor for returning said member to its starting position.

3. A measuring device for controlling the operation of mechanism for feeding strip material, including a rotatable member, an adjustable resetting switch and a stationary stop switch, said rotatable member having rotation between said resetting switch and said stopping switch, said switches electrically connecting with said mechanism whereby the mechanism may be started after said rotatable member has engaged the resetting switch and is stopped when said member contacts the stopping switch, driving means connecting said member with the feeding mechanism and adapted to rotate the same form its starting position to its stopping position, and other electrically actuated means associated with the rotatable member and rendered operative upon actuation of the stopping switch to return the rotatable member to its starting position.

4. A measuring device for controlling the operation of mechanism for feeding strip material, including a rotatable member, an adjustable resetting switch and a stationary stop switch, said rotatable member having rotation between said resetting switch and said stopping switch, said switches electrically connecting with said mechanism whereby the mechanism may be started after said rotatable member has engaged the resetting switch and is stopped when said member contacts the stopping switch, a drive connecting said rotatable member with the feeding mechanism and adapted to rotate the same from its starting position to its stopping position, a clutch included in said drive, electro-magnetic means automatically energized upon actuation of the stop switch for disconnecting said drive by actuating said clutch, and other electric means associated with the rotatable member and automatically rendered operative upon actuation of the stopping switch to return the rotatable member to its starting position.

5. A measuring device for controlling the operation of conventional mechanism for feeding strip material including in combination, a rotatable member having rotation in one direction proportional to the feeding of said strip material, a stop switch positioned for actuation by said member for stopping the feeding operation, whereby the extent of rotation of said member determines the length of strip material fed by said mechanism, other means having operation to return said member to starting position, and a second switch connected in circuit with said other means and actuated by said member to stop operation of said other means when said member reaches starting position, said second switch being movable so that the starting position of said member may be varied to thus increase or decrease the extent of rotation of said member.

6. A measuring device for controlling the operation of conventional mechanism for feeding strip material including in combination, a rotatable member, a drive operatively connecting the member with the feeding mechanism whereby said member has rotation in one direction proportional to the feeding of said strip material, a clutch included in said drive, a stop switch positioned for actuation by said member to stop the feeding operation, whereby the extent of rotation of said member determines the length of strip material fed by said mechanism, other means rendered operative by the actuation of said stop switch to disconnect said drive through the clutch, an electric motor for returning said member to starting position, and a second switch connected in circuit with said motor and adapted to be actuated by said member to stop operation of the motor when the member reaches its starting position, said second switch being movable so that the starting position of said member can be varied to thereby increase or decrease the extent of rotation of said member.

7. A measuring device for controlling the operation of mechanism for feeding strip material including a rotatable member, a drive including a clutch operatively connecting said member with the feeding mechanism whereby said member is rotated in one direction proportional to the feeding of the strip material, electric motor means associated with said member for causing reverse rotation of the same when the drive is disconnected by the clutch, a stop switch positioned for actuation by said member, said stop switch simultaneously stopping said feeding mechanism, causing actuation of the clutch to disconnect the drive, and starting operation of said electric motor means to return the said member to its initial position, and a resetting switch positioned for actuation by said member when the same reaches its initial position, said resetting switch when actuated stopping operation of said electric motor means and simultaneously connecting the drive through the clutch.

8. A measuring device for controlling the operation of mechanism for feeding strip material including a rotatable member, a drive including a clutch operatively connecting said member with the feeding mechanism whereby said member is rotated in one direction proportional to the feeding of the strip material, electric motor means associated with said member for causing reverse rotation of the same when the drive is disconnected by the clutch, a stop switch positioned for actuation by said member, said stop switch simultaneously stopping said feeding mechanism, causing actuation of the clutch to disconnect the drive, and starting operation of said electric motor means to return the said member to its initial position, a resetting switch positioned for actuation by said member when the same reaches its initial position, said resetting switch when actuated stopping operation of said electric motor means and simultaneously connecting the drive through the clutch, and rotatable means carrying said resetting switch whereby the same can be adjusted to vary the extent of rotation of the member between said resetting and stopping switches.

9. A measuring device for controlling the operation of mechanism for feeding strip material including a rotatable member, a drive including a clutch operatively connecting said member with the feeding mechanism, whereby said member is rotated in one direction proportional to the feeding of the strip material, an electric motor associated with said member for causing reverse rotation of the same when said drive is disconnected by the clutch, a stop switch positioned for actuation by said member for stopping operation of the feeding means and for simultaneously actuating said clutch to disconnect the drive, a resetting switch positioned for actuation by said member when the same is returned to its initial position, said resetting switch when actuated rendering the clutch operative to connect the drive, and means for preventing rebound of the member due to the contact of the same with the resetting switch.

10. A measuring device for controlling the operation of mechanism for feeding strip material including a member adapted to be moved in one direction by said mechanism proportional to the feeding of said material, means positioned for successive actuation by said member during movement thereof including means operative to reduce the speed of said mechanism whereby the feeding of said material takes place at a slower speed, and means for stopping said mechanism.

11. A measuring device for controlling the operation of mechanism for feeding strip material, including a rotatable member adapted to be rotated in one direction by said mechanism proportional to the feeding of the said material, a pair of switches positioned for successive actuation by said member during rotation thereof including a switch operative to reduce the speed of said mechanism whereby the feeding of said material takes place at a slower speed, and a switch having operation when actuated to stop said mechanism.

12. A measuring device for controlling the operation of mechanism for feeding strip material including a member adapted to be moved in one direction by said mechanism proportional to the feeding of said material, a stop switch positioned for actuation by said member after a predetermined extent of movement has taken place to stop operation of the feeding mechanism, means rendered operative by the actuation of said stop switch for disconnecting the drive imparting movement to said member, returning means also rendered operative for returning said member to its starting position, and a resetting switch actuated by said member when the same reaches its starting position to set the device for another measuring cycle by stopping the returning means therefor and simultaneously reconnecting the drive to the member.

13. A measuring device for controlling the operation of mechanism for feeding strip material, including a rotatable member, a drive including clutch means operatively connecting said member with the feeding mechanism whereby said member is caused to have rotary movement in one direction proportional to the feeding of the strip material, an electric motor having operative connection with the said member for causing reverse rotation of the same when said drive is disconnected by the clutch means, a stop switch positioned for actuation by said member for stopping operation of the feeding means after a predetermined extent of rotation has taken place, said actuation of the stop switch simultaneously actuating the clutch means to disconnect the drive and starting operation of the electric motor to return the member to its starting position, and a resetting switch located at the starting position of said member and actuated thereby when said member is returned to a starting position, said resetting switch electrically connecting with the motor thereby stopping operation of the same when actuated and said resetting switch also rendering the clutch operative to connect the drive.

14. In a measuring device, the combination with conventional strip feeding mechanism, of a rotatable member, drive means operatively connecting the member with the feeding mechanism whereby the member rotates in one direction proportional to the feeding of the strip material, an electric switch positioned for actuation by said member after a predetermined extent of rotation has taken place for stopping operation of the feeding mechanism, other electrically energized means rendered operative by actuation of said switch for disconnecting the drive means and for returning said member to its starting position, said other means including a solenoid actuated clutch for disconnecting said drive means and an electric motor for returning said member to its starting position, and connections between said electric motor and rotatable member including friction driving means whereby said member is frictionally driven in a return direction.

15. In a measuring device, the combination with conventional strip feeding mechanism, of a shaft member rotatably journalled by said device, a main gear carried by said shaft so as to rotate therewith and having a cam portion extending from the periphery thereof, drive means operatively connecting the main gear with the feeding mechanism whereby the shaft rotates in one direction proportional to the feeding of the strip material, a clutch included in said drive means, a stop switch positioned for actuation by the cam portion on the main gear to stop operation of said feeding mechanism, other means rendered operative by the actuation of said stop switch for disconnecting the drive means through the clutch and for returning said shaft member to its starting position, said other means including a solenoid for actuating the clutch and an electric motor for returning the shaft to its starting position, and connections between the electric motor and said main gear including friction driving means whereby the shaft is frictionally driven in a return direction.

16. In a measuring device, the combination with conventional strip feeding mechanism, of a shaft member rotatably journalled by said device, a main gear carried by said shaft so as to rotate therewith and having a cam portion extending from the periphery thereof, drive means operatively connecting the main gear with the feeding mechanism whereby the shaft rotates in one direction proportional to the feeding of the strip material, a clutch included in said drive means, a stop switch positioned for actuation by the cam portion on said main gear to stop operation of said feeding mechanism, other means rendered operative by the actuation of said stop switch to disconnect the drive means through the clutch, an electric motor for returning said shaft to starting position, and connections from said electric motor to said main gear including friction driving means whereby the shaft is frictionally driven in a return direction.

17. In a measuring device for controlling the operation of conventional strip feeding mechanism, in combination, a rotatable member adapted to be rotated in one direction by said mechanism proportional to the feeding of the strip material, a pair of switches positioned for successive actuation by said member during said rotation thereof including a switch operative to reduce the speed of said mechanism and a stop switch having operation when actuated to stop said mechanism, an electric motor for returning the member to starting position, and electrical connections for said motor including other switch means associated with the said stop switch and operating to close the circuit to the motor to start the same when the stop switch is actuated to stop the feeding mechanism.

18. In a measuring device for controlling the operation of conventional strip feeding mechanism, in combination, a shaft member rotatably journalled by said device and adapted to be rotated in one direction by said mechanism proportional to the feeding of the strip material, a main gear carried by said shaft so as to rotate therewith and having a cam portion extending from the periphery thereof, a pair of switches positioned for successive actuation by the cam portion on the main gear during said rotation thereof including a switch operative to reduce the speed of said mechanism and a switch having operation when actuated to stop said mechanism, an electric motor for returning the shaft to starting position, and connections from the motor to said main gear.

19. In a measuring device for controlling the operation of conventional strip feeding mechanism, in combination, a shaft member rotatably journalled by said device and adapted to be rotated in one direction by said mechanism proportional to the feeding of the strip material, a main gear carried by said shaft so as to rotate therewith and having a cam portion extending from the periphery thereof, a pair of switches positioned for successive actuation by the cam portion on the main gear during said rotation thereof including a switch operative to reduce the speed of said mechanism and a stop switch having operation when actuated to stop said mechanism, means having driving engagement with said main gear for returning the shaft to starting position following actuation of said stop switch, a second gear mounted for rotation on said shaft and disposed adjacent the main gear, and means provided by said second gear for limiting the return rotation of said main gear and thus the shaft.

20. In a measuring device for controlling the operation of conventional strip feeding mechanism, in combination, a shaft member rotatably journalled by said device and adapted to be rotated in one direction by said mechanism proportional to the feeding of the strip material, a main gear carried by said shaft so as to rotate therewith and having a cam portion extending from the periphery thereof, a pair of switches positioned for successive actuation by the cam portion on the main gear during said rotation thereof including a switch operative to reduce the speed of said mechanism and a stop switch having operation when actuated to stop said mechanism, means having driving engagement with said main gear for returning the shaft to starting position following actuation of said stop switch, a second gear journalled by said shaft and disposed adajacent the main gear, and interengaging means provided by said gears respectively for defining the starting position of said main gear, said second gear being rotatable independently of the shaft whereby the starting position of the main gear is adjustable.

21. In a measuring device for controlling the operation of conventional strip feeding mechanism, in combination, a shaft member rotatably journalled by said device and adapted to be rotated in one direction by said mechanism proportional to the feeding of the strip material, a main gear carried by said shaft so as to rotate therewith and having a cam portion extending from the periphery thereof, a pair of switches positioned for successive actuation by the cam portion on the main gear during said rotation thereof including a switch for reducing the speed of said mechanism when actuated and a switch for stopping said mechanism when actuated, an electric motor having driving engagement with said main gear for returning the gear and thus the shaft to starting position, and means located at the starting position for preventing rebound of the main gear after the same has been returned to said starting position.

22. In a measuring device for controlling the operation of conventional strip feeding mechanism, in combination, a shaft member rotatably journalled by said device and adapted to be rotated in one direction by said mechanism proportional to the feeding of the strip material, a main gear carried by said shaft so as to rotate therewith and having a cam portion extending from the periphery thereof, a pair of switches positioned for successive actuation by the cam portion on the main gear during said rotation thereof including a switch for reducing the speed of said mechanism when actuated and a switch for stopping said mechanism when actuated, electric motor means having driving engagement with said main gear for returning the gear and thus the shaft to starting position following actuation of said stop switch, a second gear mounted on said shaft for rotation independently of the shaft whereby said second gear is adjustable with respect to the main gear, and an electric switch carried by said adjustable second gear for controlling the operation of said electric motor means.

FREDERICK M. LITTELL.